United States Patent

[11] 3,548,149

[72] Inventors Alfred T. Rizzolo
 Newark;
 Warren F. Hicks, Wayne, N.J.
[21] Appl. No. 716,924
[22] Filed Mar. 28, 1968
[45] Patented Dec. 15, 1970
[73] Assignee Cheston Company
 Kearny, N.J.
 a corporation of New Jersey

[54] RESISTANCE METAL HEATER
 9 Claims, 6 Drawing Figs.
[52] U.S. Cl. .................................................. 219/156
[51] Int. Cl. .................................................. C21d 9/62,
 H05b 1/00
[50] Field of Search ........................................ 219/156,
 161, 50

[56] References Cited
UNITED STATES PATENTS
466,131  12/1891  Angell ..................... 219/156
2,052,761  9/1936  Gaines ..................... 219/156

Primary Examiner—J. V. Truhe
Assistant Examiner—Lawrence A. Rouse
Attorney—Brumbaugh, Graves, Donohoe & Raymond ABSTRACT: An electrical resistance heater has spaced pairs of electrodes, the electrodes in each pair being movable towards one another and having opposed notches formed therein converging generally away from the ends of a workpiece to be heated and adapted to cooperate to form end clamps for the workpiece. One electrode of each pair is mounted to have limited freedom of movement relatively to the other to facilitate clamping the ends of a workpiece between the electrode pairs. Also, controlled semiconductor rectifier means is provided for supplying different values of heating current to the workpiece for different periods of time in a heating cycle.

INVENTORS
ALFRED T. RIZZOLO &
WARREN F. HICKS
BY
Brumbaugh, Free, Graves & Donohue
their ATTORNEYS

INVENTORS
ALFRED T. RIZZOLO &
BY WARREN F. HICKS their ATTORNEYS

RESISTANCE METAL HEATER

BACKGROUND OF THE INVENTION

1. Field of the Invention

The present invention relates to electrical resistance heaters for heating stock pieces such as bars, rods and the like prior to hot forging or other hot metal working operations. More particularly, it has to do with improvements in the electrodes which supply electric current to the stock pieces during heating, in the mounts therefor and in the system for controlling the current supplied to the electrodes.

2. Description of the Prior Art

The copending application Ser. No. 484,194, filed Sept. 1, 1965, now U.S. Pat. No. 3,418,447, by Albert T. Rizzolo and Warren F. Hicks, for "Resistance Metal Heater" disclosed an electrical resistance type heater in which electrodes for engaging spaced apart portions of the article to be heated are adapted to be supplied with heating current from a transformer and controlled by means of a saturable core reactor.

SUMMARY OF THE INVENTION

This application is addressed to improved electrical resistance heater apparatus of this general character which has the capability of bringing the stock to be heated to a desired temperature in a shorter time than has been possible heretofore with reduced contact pressure and current density at areas of contact, whereby the hazard of surface marking and subsurface metallurgical damage is minimized. This is accomplished, according to the invention, by providing electrodes having a plurality of "V"-shaped or notched contacts forming an approximate cone when in the closed or stock gripping position. Further, the electrodes are mounted in a yielding suspension so as to permit seating or "wiping" action when opposing pressure is applied to a stock member by the movable contact assemblies.

By virtue of this construction, the electrodes make contact with the workpiece at its very extremities so that positive heating action will extend along its full length; the heat-sink or cooling action at the extremities of the workpiece is reduced since the total contact area is minimized; and proper location of the workpiece when fed into the heater is aided, the planes of the angled contacts tending to force it towards the center as gripping action takes place.

The invention also contemplates the provision of a novel control system utilizing amplifier means employing controlled semiconductor rectifier means together with magnetic amplifier semiconductor firing circuits to provide control of the voltage supplied to the electrodes. Current limiting circuitry is also incorporated to regulate the maximum current drawn, and means are provided for controlling the controlled semiconductor rectifier means to permit the current initially to rise rapidly and in essentially square wave form, to an optimum level, without the formation of high power spikes.

DESCRIPTION OF THE PREFERRED EMBODIMENT

For purposes of illustration, the invention will be disclosed herein as embodied in electrical resistance heating apparatus of the type shown in the aforementioned application Ser. No. 484,194.

Figures 1, 2:
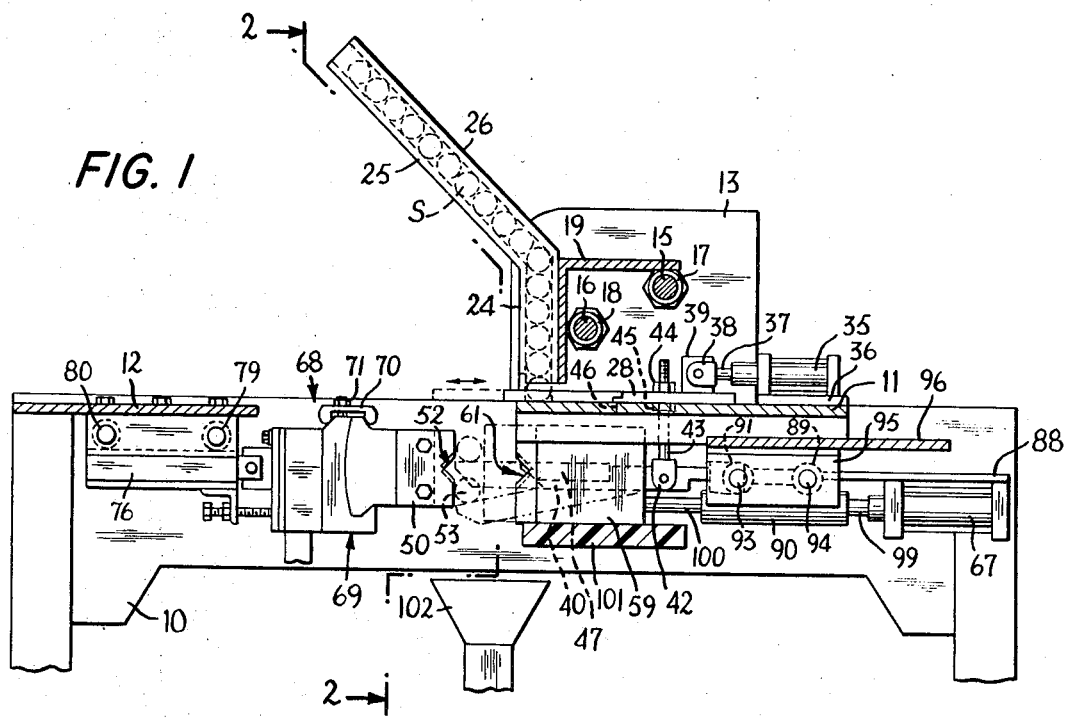
FIG. 1 is a sideview in elevation, partly in section, of electrical heater apparatus embodying the invention.
FIG. 2 is a front view in elevation of the heater apparatus shown in FIG. 1.

Referring first to FIGS. 1 and 2, a typical electrical resistance heater includes a supporting frame 10 provided with an upper fixed platelike platform or support 11 adjacent the midportion thereof and another supporting plate portion 12 adjacent the left-hand end thereof as viewed in FIG. 1. Extending upwardly from the platform 11 are a pair of platelike side frame members 13 and 14 in which are rotatably received a pair of threaded screw shafts 15 and 16. A pair of sleeves 17 and 18 on an anglelike support 19 receives the shafts 15 and 16 slidably to enable the adjustment of the plates along the shafts. Pairs of nuts 20, 21, 22 and 23 are threaded on the shaft and engage the opposite ends of the sleeves 17 and 18 to permit adjustment of the support 19 towards and away from the plates 13 and 14. Mounted on the angle member 19 is a guide member 24 which at its upper end is inclined downwardly and has a supporting plate 25 and a flange member 26 for guiding one end of a series of stock pieces S.

A similar guide member 27 is also supported on the shafts 15 and 16 and is similarly constructed for engaging the opposite ends of the stock pieces. The angle member 19 associated with each of the guides 24 and 27 closes the back side of the guide and thereby provides a channel-shaped portion through which the stock pieces S are fed downwardly by gravity in a generally vertical direction toward the supporting plate 11.

Slidably mounted on the supporting plate member is an ejecting plate 28 which as shown in FIGS. 1 and 2 has forwardly projecting arms 29 and 30 thereon with inwardly projecting portions 31 and 32 providing notches 33 and 34 for receiving the ends of the lowermost stock piece S in the guides 24 and 27.

It will be apparent that by adjusting the nuts 20 to 23 along the shafts 15 and 16, the spacing between the guides 24 and 27 can be adjusted to receive stock piece S of different lengths. A plurality of such units may be mounted in side-by-side relation. To accommodate stock pieces of varying lengths, the front sections of the ejecting plate 28 can be replaced or made adjustable in width, if so desired. The ejecting plate 28 is reciprocated on the supporting plate 11 by means of a suitable air cylinder or air motor 35 which is fastened to a plate or other support 36 connected to or forming a part of the support 11. A connecting rod 37 of the air motor is connected by means of a clevis 38 to an upstanding lug 39 on the ejecting plate 28 so that upon projection of the connecting rod, the slide plate is moved to the left and upon retraction of the connecting rod the ejecting plate is moved to the right as viewed in FIG. 1.

As shown in FIGS. 1 and 2, the notches 33 and 34 are disposed in alignment with the lower end of the guides 24 and 27 so that a stock piece S can drop into the notches 33 and 34. As the slide plate 28 is moved to the left (FIG. 1) by means of an air cylinder or motor 35, the stock piece engaged in the notches is also moved to the left until it drops over the left-hand edge of the supporting plate 11. The stock piece above the one being ejected engages the upper surface of the ejecting plate 28 and cannot drop down to interfere with the movement of the slide plate. As the stock piece moves beyond the edge of the plate 11, it drops down onto a guide (FIGS. 1 and 2) which includes a pair of guide fingers 40 and 41, one of which 40 is shown in FIG. 1. The guide finger 40, for example, is a lever which is pivotally supported in a clevis 42 mounted on a shaft 43 which is fixed to and movable with the ejecting plate 28 by means of a pair of nuts 44 and 45. The shaft 43 and the nut 44 are slidable in a slot 46 in the support plate 11 so that the lever 41 moves with the slide plate 28 between the full line position and the dotted line position shown in FIG. 1. At the right-hand end of the lever 41 is a counterweight 47 which normally holds the guide finger in a horizontal position.

Figure 3:
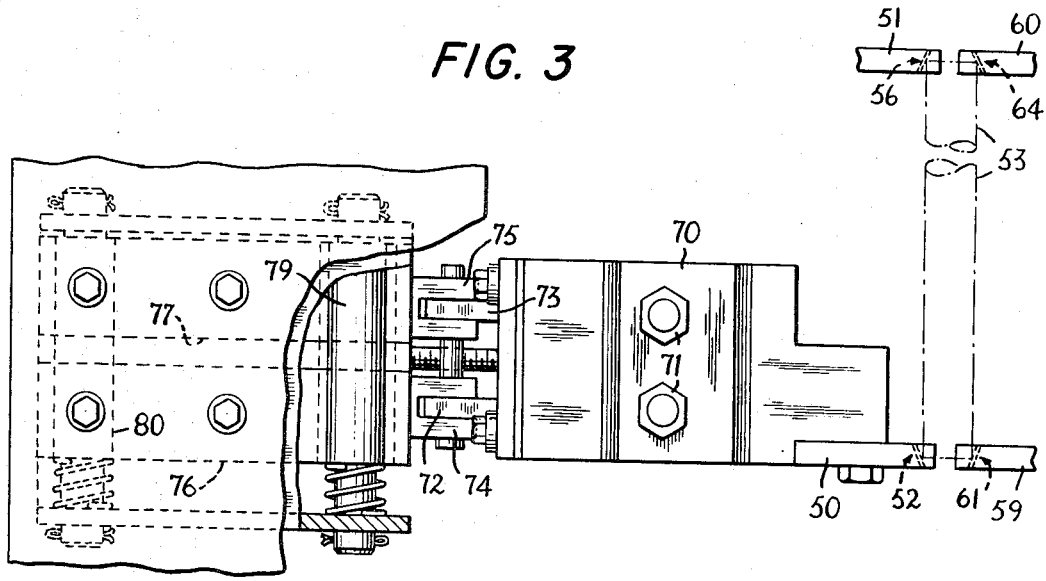
FIG. 3 is a top partial view showing one pair of opposed stock gripping electrodes on the apparatus of FIG. 1.

The guide fingers 40 and 41 carry an inverted channel-shaped guide plate 47 on their upper surfaces, the plate being fixed to the left-hand end of the levers as viewed in FIG. 1 and spanning the space between them and serving to receive and support a stock piece. The weight of the stock piece tilts the plate and fingers downwardly so that the stock piece will roll into engagement with the fixed electrodes 50 and 51 of the heater as best shown in FIGS. 1 and 3.

The electrode 50 has formed therein a V-shaped notch 52 (FIGS. 4 and 5) of a suitable size to receive the end of a stock piece 53 therein. The side 54 of the notch 52 has a small taper in a downward direction to the left looking towards the machine from the right-hand end in FIG. 3, at about 10° to the horizontal, and the adjacent side 55 has a corresponding small taper in an upward direction to the left, looking towards the machine at about 10° to the horizontal.

A similar V-shaped notch (not shown) is formed in the electrode 51 which has sides tapering upwardly and downwardly at an angle of about 10° to the right looking towards the machine from the left-hand end in FIG. 2. thereof.

Another pair of cooperating electrodes 59 and 60 is mounted for sliding movement towards and away from the electrodes 50 and 51, respectively, to grip the ends of a stock piece between them and support it while current passes through it during the heating operation. To this end, the electrode 59 (FIGS. 3 and 4) has formed therein a notch 61 of the same size and shape as the notch 52 in the electrode 50 and in opposed relation to the notch 52. The notch 61 has adjacent sides 62 and 63 (FIG. 2) tapering a small amount upwardly and downwardly, respectively, to the right looking towards the machine from the right-hand side in FIG. 2, both at an angle of about 10° to the horizontal.

A similar notch 64 is formed in the electrode 60, located in opposed relation to the notch 56 in the electrode 51. It has sides 65 and 66 tapering upwardly and downwardly, respectively, to the left looking towards the machine from the left-hand end in FIG. 2, at an angle of about 10° to the horizontal.

It will be observed that the opposed pairs of notches each form an approximate cone with the apex outboard when the electrode assemblies are in the closed or grip position, and each achieve four areas of contact on the workpiece.

Each of the electrodes 59 and 60 is adapted to be moved towards and away from the electrodes 50 and 51 by means of an air cylinder or motor 67. As will be explained hereinafter, one of the pairs of electrodes 50 and 59, 51 and 60, or both pairs of electrodes are mounted for movement generally axially of the stock piece to allow endwise expansion of the stock piece as it is heated.

Figure 4:
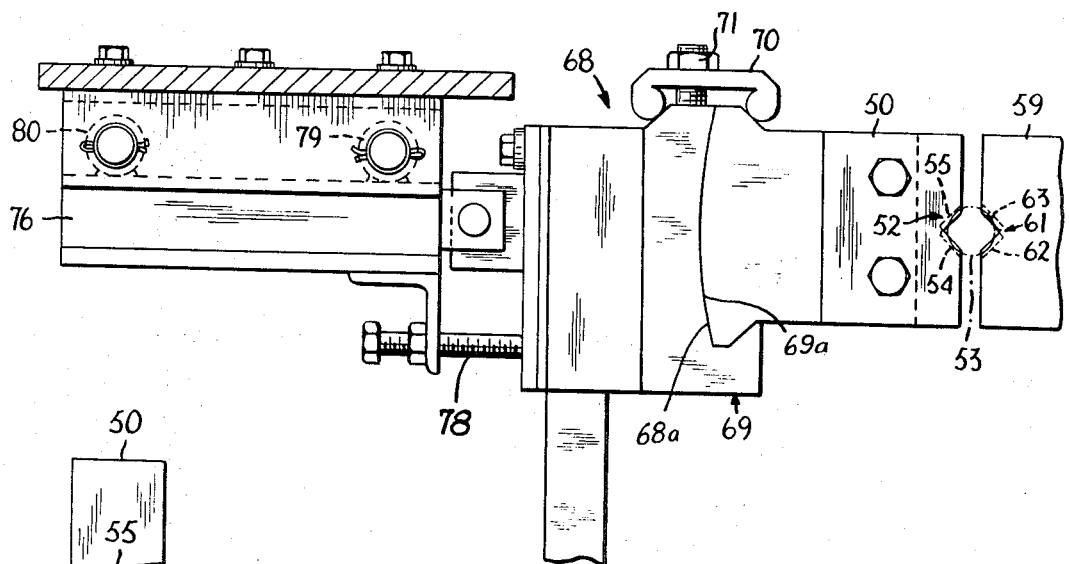
FIG. 4 is a side view of the opposed electrodes shown in FIG. 3.
Figure 5:
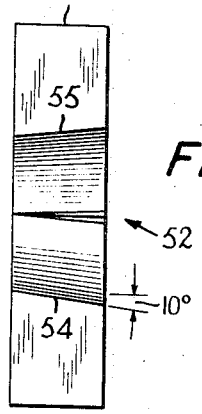
FIG. 5 is an end view of the electrode shown in FIG. 4, looking into the V-shaped contact formed therein.

Referring now to FIGS. 3 and 4, each of the electrodes 50 and 51 is mounted in similar electrode clamps 68 which may suitably consist of a rectangular block having a forwardly extending flange 69 and a removable clamp member 70 secured by means of a stud and nut 71 for engaging the electrode 50 and securing it in position. Cooperating concave and convex bearing surfaces 68a and 69a, respectively, are formed in the clamp 68 and on the electrode 50, respectively, which maintain good electrical contact and effective heat transfer at the elevated temperatures obtaining during the heating operation. The clamp 68 has two rearwardly extending lugs 72 and 73 which are pivotally mounted in clevises 74 and 75, respectively, secured to horizontally extending arms 76 and 77, respectively. In this fashion, the electrodes 50 and 51 are hingedly suspended to permit seating or "wiping" action of a stock piece between the electrodes when they are brought together into clamping position. An adjustable stop 78 establishes a bottom positional limit for the clamping member 68 and otherwise assures control and stability.

The arms 76 and 77 are provided with a pair of sleeves 79 and 80 welded or otherwise secured thereto. The sleeves 79 and 80 are preferably slidably mounted on shafts in the manner shown in the aforementioned copending application Ser. No. 484,194 and means provided permitting yielding lateral displacement for one or both of the electrodes 50 and 51 to accommodate lateral expansion of a workpiece during heating. Similar mounting means may be provided for one or both of the electrodes 59 and 60 for the same purpose.

As shown in FIG. 1, the air motor or cylinder 67 is mounted on a plate 88 which is welded at its inner end to a tubular sleeve 89. The sleeve 89 extends crosswise of a tubular guide member 90 which also carries another transversely extending tubular sleeve 91 thereon. The sleeves 89 and 91 are provided with Teflon bushings for sliding movement on the shafts 93 and 94 which are fixed in the inverted channel member 95 secured to a supporting plate 96 mounted in the frame 10. Springs (not shown) are interposed between the ends of the sleeves 89 and 91 and a flange (not shown) on the channel 95 to allow the air motor 67 and the guide sleeve 90 to move against the pressure of the spring in the direction of thermal expansion of a stock piece while it is being heated, all as disclosed in the aforementioned copending application.

The guide 90 receives the air cylinder piston rod 99 and a coupling, not shown, for connecting the piston rod 99 to a guide shaft 100 on which the movable electrode 59 is mounted. The other electrode 60 is similarly mounted. If necessary, an insulated support 101 may be provided for aiding in guiding and supporting the movable electrodes 59 and 60.

It will be apparent, therefore, that the electrodes 59 and 60 can be moved towards the fixed electrodes 50 and 51 to grip a stock piece between them and away from the fixed electrodes to discharge a stock piece and receive another stock piece for heating therebetween.

In operation, the movements of the components described above take place in timed relation. With the electrodes 59 and 60 and the ejecting plate 28 retracted, the notches 33 and 34 are in alignment with the stock feed guides 24 and 27 and receive a stock piece S therefrom. The first movement is the advancing of the ejecting plate 28 by means of the air motor 35 together with guide plate 47 and fingers 40 and 41 until the stock piece moved by the ejecting plate passes beyond the support platform 11 and drops onto the feed plate 47 causing the latter to tilt and allow the stock piece to roll down into engagement with the fixed electrodes 50 and 51 in the notches formed therein. The movable electrodes 59 and 60 are then advanced by means of the air motor 67 to grip the ends of the stock piece between the notches formed in them and the notches formed in the electrodes 50 and 51.

As soon as the stock piece is gripped by the electrodes, the ejecting plate 28 and the guide plate 47 and fingers 40 and 41 are retracted by means of the air motor 35 and thereafter current is passed between the electrodes at opposite ends of the stock piece to heat it. When the stock piece has been heated for a predetermined period of time, the movable electrodes 59 and 60 are retracted by means of their air motors allowing the heated stock pieces to drop down into a chute 102 or onto a conveyor to be carried away to a hot forging press or the like. The above-described operation is repeated to supply a succession of heated stock pieces.

Figure 6:
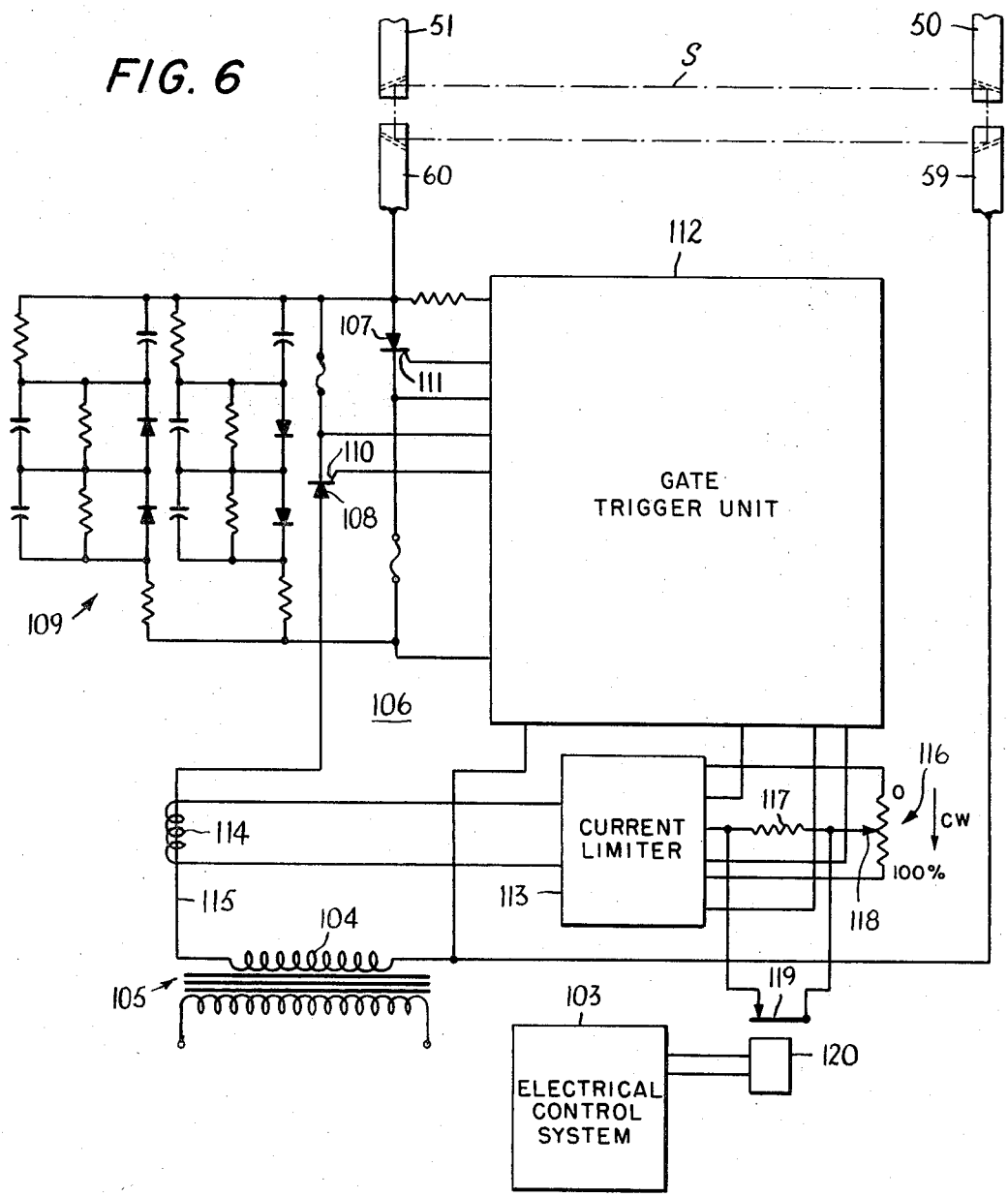
FIG. 6 is a schematic diagram of a typical control system for the apparatus shown in FIG. 1.

The cycle of operations described above can be accomplished with the control system 103 disclosed in FIG. 6 which may be substantially the same as that disclosed in the aforementioned copending application Ser. No. 484,194, and it will not be necessary, therefore, to describe the circuit in detail herein.

As shown in FIG. 6, the heating electrodes are supplied with current from the secondary winding 104 of a transformer 105 through a controlled semiconductor rectifier 106, such as a silicon controlled rectifier. The rectifier 106 may be of conventional form including a pair of silicon controlled rectifiers 107 and 108 connected back-to-back for full wave rectification. Preferably, the rectifiers 107 and 108 are shunted by a conventional suppressor circuit 109 to suppress undesired current surges.

The control electrodes 110 and 111 of the rectifiers 107 and 108 are connected to a conventional gate trigger controller 112 which supplies the necessary control signals to render the rectifiers 107 and 108 conducting as required to supply current to the heating electrodes. The gate trigger controller 112 is conventional and it may employ hybrid magnetic amplifier semiconductor firing circuits to provide proportional control of the AC output voltage. Preferably, it also incorporates conventional means 113 responsive to a current transformer 114 linking one of the current input conductors 115 to regulate the maximum current that can be drawn, in response to the setting of an adjustable potentiometer 116.

Usually, each heating cycle comprises three stages, viz., the initial power application stage, during which the transformer 105 and the workpiece become electrically saturated; the normal heating stage during which the natural resistance of the workpiece to the uniform high current flow causes a heating action; and the post-Curie point heating state (in magnetic materials), during which the heating characteristics of the material change appreciably, and the power input requirements must be changed correspondingly.

In the first and third stages, the heating must be effected at reduced power. This is accomplished by connecting to the potentiometer 116 during these two periods in the heating cycle a resistance 117 of the proper value to reduce the maximum current supplied to the heating electrodes so that the desired degree of heat will be achieved. To this end, the resistance 117 is inserted in series with the potentiometer slider 118 and is connected to be normally shorted out by the normally closed contacts 119 of a relay 120. The relay 120 is adapted to be energized to open its contacts 119 during the first and third stages of each heating cycle, by a main timer (not shown) in the control system 103 which initiates the sequence of operations carried out by the heater apparatus.

The invention thus provides simple yet highly effective electrical resistance heater means for heating stock metal pieces prior to a metal working operation such as forging, for example. By providing electrodes with tapered "V" or notched contacts, and a hinged suspension for at least one of the electrodes, contact at the very extremities of the workpiece is assured so that positive heating action will extend the full length of the workpiece. Also, by utilizing silicon controlled rectifier means for controlling the electrical energy supplied to the electrodes, the workpiece can be brought to forging temperature in a remarkably short time without excessively high demand power in the initial stage of the heating process.

The specific embodiment described herein by way of example is obviously susceptible of modification within the scope of the invention, and the latter is intended to cover all such modifications as are encompassed by the following claims.

We claim:

1. In an electrical heater for heating workpieces, the combination of:
   first and second pairs of opposed electrodes;
   means for effecting relative movement of the electrodes in said pairs selectively towards and away from each other;
   and cooperating means in each of the pairs of electrodes defining a workpiece end receiving clamp;
   each of said clamps having workpiece end engaging surfaces converging away from and in electrical contact with, a workpiece end clamped therebetween.

2. An electrical heater combination as defined in claim 1 in which one electrode in each of said pairs is fixed and the other electrode in each pair is movable towards and away from said one electrode.

3. An electrical heater combination as defined in claim 2 in which said one electrode in each of said pairs is capable of limited movement in directions generally transverse to the direction of movement of the said other electrodes to accommodate a workpiece therein when said other electrodes are advanced towards the said one electrodes of said pairs to clamp a workpiece therebetween.

4. An electrical heater combination as defined in claim 3 in which said one electrode in each of said pairs is pivotally mounted on a slide member, and adjustable stop means is provided for establishing a nominal rest position for said one electrode in relation to said slide member.

5. An electrical heater combination as defined in claim 4 in which each electrode of each pair has a generally V-shaped notch formed therein, the notches in each pair being in opposed relation and cooperating to form a workpiece end clamp of generally conical shape converging away from the end of a workpiece clamped therein.

6. An electrical heater combination as defined in claim 5 together with controlled semiconductor rectifier means adapted to be energized by an electrical source and connected to supply heating current to said electrodes, current limiting means for said rectifier means having means for adjusting the current supplied to said electrodes selectively to starting and running values, and control means for operating said current adjusting means in predetermined timed relation.

7. An electrical heater combination as defined in claim 6 together with suppressor means connected to said rectifier means for suppressing undesired current variations.

8. An electrical heater combination as defined in claim 6 together with timer means responsive to said adjusting means first to limit the current supplied by said rectifier means initially to a low starting value, then to increase the current supplied by said rectifier means to a higher running value for a predetermined interval of time, and then to reduce the current to a lower terminal value for a predetermined interval of time.

9. An electrical heater combination as defined in claim 1, further comprising clamping means associated with at least one electrode having a curved bearing surface, said one electrode having a curved bearing surface matching the bearing surface of said associated clamping means, and means retaining said clamping means and said electrode in assembled relation with said bearing surfaces in snug mechanical engagement.